US008228943B2

(12) United States Patent
De-Leon et al.

(10) Patent No.: US 8,228,943 B2
(45) Date of Patent: Jul. 24, 2012

(54) SYSTEMS AND METHODS FOR PROVIDING FRAMING MAPPING, MUXING AND DATA PROCESSING

(75) Inventors: Moshe De-Leon, Kiriat (IL); Yuval Berger, Kfar Vitkin (IL); Yehuda Kra, Modiin (IL); Barak Perlman, Rechovot (IL)

(73) Assignee: Siverge Networks Ltd, Herzliya (IL)

( * ) Notice: Subject to any disclaimer, the term of this patent is extended or adjusted under 35 U.S.C. 154(b) by 515 days.

(21) Appl. No.: 12/074,708

(22) Filed: Mar. 5, 2008

(65) Prior Publication Data
US 2008/0225880 A1 Sep. 18, 2008

Related U.S. Application Data

(60) Provisional application No. 60/905,401, filed on Mar. 5, 2007.

(51) Int. Cl.
*H04J 3/22* (2006.01)
(52) U.S. Cl. .......................... 370/466; 370/532; 370/536
(58) Field of Classification Search .................. 370/276, 370/277, 295, 503, 465, 466, 467, 468, 532, 370/533, 535, 536, 538, 539, 540, 541, 542
See application file for complete search history.

(56) References Cited

U.S. PATENT DOCUMENTS

| 6,374,307 | B1 * | 4/2002 | Ristau et al. | 709/249 |
| 6,917,630 | B1 * | 7/2005 | Russell et al. | 370/532 |
| 7,436,824 | B2 * | 10/2008 | Pepenella | 370/386 |
| 2004/0076168 | A1 * | 4/2004 | Patenaude | 370/406 |
| 2005/0025195 | A1 * | 2/2005 | Barrett et al. | 370/532 |

OTHER PUBLICATIONS

PMC by PMC-SIERRA 2004.*

* cited by examiner

*Primary Examiner* — Kibrom T Hailu
*Assistant Examiner* — Dady Chery

(57) ABSTRACT

A method and system for providing Layer 1 time division multiplexing (TDM) framing, multiplexing, and mapping as well as Layer 2 data and protocol processing. One embodiment of the invention provides an integrated Layer1/Layer2 service aggregator within a single-device. Such an embodiment provides a complete System-on-Chip implementation for clear channel and deeply channelized OC-48 (STM-16), 4×OC12/3 (STM4/1) application of 2,000 channels or more. One embodiment implements functionality of Layer2 data and protocol processing as well as Layer1 TDM framing, multiplexing and mapping. For one embodiment, target applications include packet-based transport systems, multi-service access and metro systems, switches and routers and ADM/MSPP systems.

18 Claims, 5 Drawing Sheets

SYSTEMS AND METHODS FOR PROVIDING FRAMING MAPPING, MUXING AND DATA PROCESSING

CLAIM OF PRIORITY

This application claims priority from U.S. Provisional Patent Application No. 60/905,401, entitled "Systems and Methods for Providing Framing, Mapping, Muxing and Data Processing", filed on Mar. 5, 2007.

FIELD

Embodiments of the invention relate generally to the field of telecommunication infrastructure, and more specifically to data communication and processing.

BACKGROUND

Conventional telecommunications infrastructure and systems implement Layer 1 time division multiplexing (TDM) framing, multiplexing, and mapping as well as Layer 2 data and protocol processing using a number of separate dedicated devices. Typically, these functionalities may be implemented using dozens of separate devices requiring interconnection with each other. Such implementation results in a substantial amount of redundancy, excessive and unwarranted manufacturing and operational costs as well as operational and power consumption inefficiencies.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
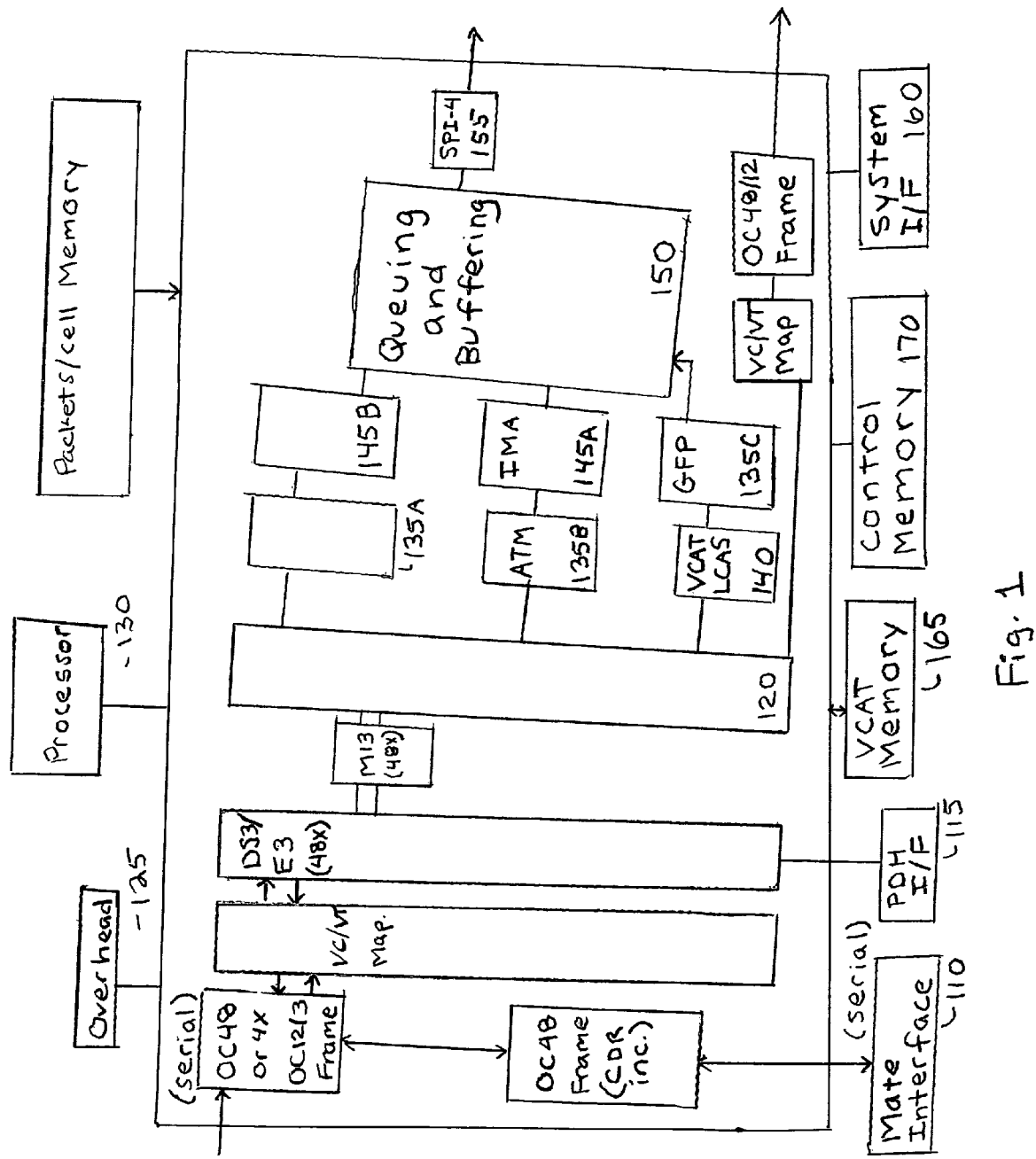
FIG. 1 illustrates a system for providing Layer 1 time division multiplexing (TDM) framing, multiplexing, and mapping as well as Layer 2 data and protocol processing in accordance with one embodiment of the invention.

Systems and methods for providing Layer 1 time division multiplexing (TDM) framing, multiplexing, and mapping as well as Layer 2 data and protocol processing. One embodiment of the invention provides an integrated Layer 1/Layer 2 service aggregator within a single-device. Such an embodiment provides a complete System-on-Chip implementation for clear channel and deeply channelized OC-48(Synchronous Transport Mode (STM-16)), 4×OC12/3 (STM4/1) application of at least 2,000 channels. One embodiment provides a complete System-on-Chip implementation for clear channel and deeply channelized OC-48 (STM-16), 4×OC12/3 (STM4/1) application of up to 4,000 channels. The channels may be either clear channel or channelized. One embodiment implements functionality of Layer 2 data and protocol processing as well as Layer 1 TDM framing, multiplexing and mapping. For one embodiment, target applications include packet-based transport systems, multi-service access and metro systems, switches and routers and Add/Drop Multiplexer Multi-service Provisioning Platform (ADM/MSPP) systems.

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Embodiments of the invention are applicable in a variety of settings in which data is processed and communicated.

Various alternative embodiments of the invention include systems and methods providing advantages in settings and implementations. One embodiment of the invention provides a fully integrated Layer 1/Layer 2 single monolithic aggregation device that provides a complete implementation for clear channel and deeply Channelized TDM SONET/SDH and applications with total bandwidth of up to 2.5 Giga bit per/second caring above 2000 independent or concatenated service channels.

For one embodiment the system supports the following Sonet/SDH interfaces; (a) on the Line Side one multi-rate SONET/SDH interface capable of operating at 2.5 Gbit/s, 622 Mbit/s and 155 Mbit/s and three multi-rate SONET/SDH interfaces capable of operating at 622 Mbit/s and 155 Mbit/s including integrated CDRs, (b) On System Side TDM (to connect to TSI or for external CES) one SONET/SDH interface capable of operating at 622 Mbit/s and 2.5 Gbit/s TFI-5 compliant mode, integrated CDR. (c) On Mate side one SONET/SDH interface capable of operating at 622 Mbit/s and 2.5 Gbit/s TFI-5 compliant mode, with integrated CDR.

For one embodiment the system supports complete TDM multiplexing & mapping of the OC-48 (STM-16) or 4×OC 12/OC-3(STM-4/STM-1) payload, including OC-48c STS-48c (VC-4-16c), STS-12c (VC-4-4c), STS-3c (VC-4), STS-1, DS3/E3, DS1/E1/J1(either directly mapped to SONET/SDH or via M13) and DS0. Channels can be configured to be either clear-channel meaning that the entire channel traffic content may be used by a single flow of communication, or configured to be channelized traffic which is subdivided into multiple fixed lower rate channels, specifically the system supports OC48c and STS-48c of 2.5 Gb/s data rate range, meaning that such channel may be used as a clear channel carrying a single flow of communication at the rate of 2.5 Gb/s with no sub-channels divisions.

For one embodiment the system supports a Mate interface (including an STS-1 cross connect between line and Mate interfaces) to allow line and line card protection, as well as connecting the device to a system backplane TDM interface for port-less (e.g., server line card) applications or mixed applications where some of the data is from the line and some from the system.

For one embodiment the system includes external overhead processing support where all SONET/SDH and PDH overhead bytes are accessible (insertion and extraction)

through external interfaces (though the device is designed to process OH bytes automatically).

For one embodiment each embedded channel (e.g., STS-48c/VC-4-4c down to DS0) of the system independently supports native mapping (including STS-1, VT and VC level cross connect functionality) to a TDM system interface (e.g., TFI-5) for circuit emulation or direct connection to a TDM backplane.

For one embodiment each of the channels can be configured to either (a) transfer TDM data between a telecom equipment system side and a client line side or (b) to packets and cells data channels extracted out of the TDM incoming data channel and constructed into the outgoing TDM data channel.

For one embodiment the channel termination and packet data processing: (any channelization from STS-48c down to DS0, up to 2K channels) include support of the following protocols ATM, HDLC, GFP, Ethernet over GFP with VCAT & LCAS support.

For one embodiment the system supports IMA & MLPPP bundling protocols.

For one embodiment the system includes a packets and cells interface (e.g., SPI-4), including store and forward as well as streaming modes, selectable flow controls and status reporting, as well as intelligent and flexible scheduling mechanisms that allow for transparent Quality of Service and Traffic Engineering options. For one such embodiment, an SPI-4.2 interface capable of operating in full rate and quarter-rate modes is used.

For one embodiment the system supports circuit emulation traffic for each possible DS1, E1 or J1 channel (or partial channel) with SAToP or CESoPSN transport mode selectable per channel. SAToP: unstructured agnostic payload transport, CESoPSN: transport of fractional E1/DS1; Programmable TDM payload size per packet, Clock recovery mode selection per channel: adaptive or differential mode, Clock reference selection from TDM ports, local reference clock or PHY clock, Jitter and wander compliant to ITU-T G.823/G.824 and G.8261 for traffic interfaces, Network synchronization compliant to ITU-T G.813 and Telcordia GR-1244 Stratum 3, through the use of IEEE1588 or NTPv4, Programmable maximum latency per port, Packet re-sequencing and missing packet detection with TDM frame replication.

For one embodiment the system includes a 32 bits synchronous external CPU interface for configuration, management, and monitoring purposes. For one such embodiment, the external CPU is Motorola and Intel compatible.

For one embodiment the system includes three 32 bit DDR2 interfaces, (ECC protected) operating at 311 MHz for packet/cell and VCAT buffering.

For one embodiment the system includes a ZBT SRAM interface operating at 155 MHz for storing bundling control data.

For one embodiment the system is implemented with no embedded CPU for data streams processing.

For one embodiment the system is implemented using integrated dedicated hardware machines each handling specific supported applications where a single machine can serve multiple independent data channel entities utilizing on chip memory for storing and retrieving specific entities when being served as well as external memory for packet, cells and bundling management temporary storage.

For one embodiment the system includes embedded monitoring and internal looping mechanism for debug and testability assistance.

For one embodiment the system supports the following product flavors, TDM functionality (e.g., framing, mapping, and multiplexing, including SONET/SDH & PDH framing, M13 and VT/VC mapping).

a. OC-48/4×OC-12/4×OC-3 (STM-16/4×STM-4/4×STM-1) device
b. OC-12/4×OC-3 (STM-4/4×STM-1) device
c. OC-3 (STM-1) device
d. 24×DS3/E3 device
e. 12×DS3/E3 (STM-4/4×STM-1) device.

For one such embodiment each product flavor supports channelized (down to DS0, up to 2K channels) legacy protocol processing (e.g., ATM, IMA, HDLC and all derivatives and MLPPP). Ethernet (and any other type of packets) over GFP over hi/lo-order SONET/SDH VCAT and PDH (DS3/E3/DS1/E1/J1) VCAT with LCAS).

FIG. 1 illustrates a system for providing Layer 1 TDM framing, multiplexing, and mapping as well as Layer 2 data and protocol processing in accordance with one embodiment of the invention. System 100, shown in FIG. 1, supports any possible multiplexing & mapping of the OC-48 (STM-16) or 4×OC12/3 (STM4/1) payload, including OC-48c (STM-16c), OC-12c (STM-4c), OC-3c (STM-1c), STS-1, DS3/E3, DS1/E1/J1 (either directly mapped to Synchronous Optical Networking/Synchronous Digital Hierarchy (Sonet/SDH) or via M13) and DS0.

For each possible channel (e.g. OC-48c/STM-16c down to DS0) the system independently supports native mapping (including Synchronous Transport Signal (STS)-1 and Virtual Tributary (VT) level cross connect functionality) to a TDM System Interface (e.g., a TDM fabric to framer interface (TFI-5)) for circuit emulation or direct connection to a TDM backplane.

For each possible channel the system supports termination and data processing at any level of channelization from OC-48c down to DS0, and up to 4K channels including ATM Cell Delineation, HDLC controller, (bit & byte HDLC, POS, LAPS, FR PPP), GFP and Ethernet over GFP including VCAT & LCAS and bundling (e.g., Inverse Multiplexing for ATM (IMA), Multi-link Point-to-Point Protocol (MLPPP) and Multi-link Frame relay (MLFR)).

As shown in FIG. 1, system 100 includes a serial TDM line interface 105 and mate interface 110 of Sonet/SDH and Plesiochronous Digital Hierarchy (PDH) interface 115. For one embodiment the system includes an STS-1 cross connect between line and mate interfaces. One such embodiment allows line and line card protection, as well as connecting the device to a system backplane TDM interface, for port-less applications (or mixed applications where some of the data is from the line and some from the system).

For one embodiment, the line side supports one multi-rate SONET/SDH interface capable of operating at 2.5 Gbits/s, 622 Mbits/s and 155 Mbits/s and three multi-rate SONET/SDH interfaces capable operating at 622 Mbits/s and 155 Mbits/s including integrated CDRs.

For one embodiment, All SONET/SDH and PDH Over-Head bytes are accessible (insertion and extraction) through an external OH interface (though the device is designed to process OH bytes automatically).

System 100 also includes mapping and framing to DS3/DS1/DS0 multiple channels 120 as well as overhead processing interface 125 and CPU interface 130. system 100 supports TDM traffic Payload packet and cell processing of HDLC 135A and ATM 135B. Embodiments of the invention may also support Generic Framing Procedures (GFP) 135C and Frame Relay (FR). System 100 also provides TDM channels Virtual Concatenation (VCAT) and Link Capacity Adjustment Scheme (LCAS) support 140. As noted above, embodiments of the invention provide support for packets and cells channels bundling, shown for example in FIG. 1 as 145A and 145B for IMA and MLPP/MLFR, respectively. System 100 also packet buffering and queuing support 150.

System 100 also includes packet interface and a serial system interface. A packet interface, which may be implemented as a System Packet Interface Level 4 (SPI-4), is shown as SPI-4 Interface 155. For one embodiment, a system SPI-4.2 packet/cell interface supports various operating modes including store and forward as well as streaming modes, various flow controls and status reporting (both in-band and out-of-band) as well as intelligent and flexible scheduling mechanisms that allow for transparent QoS and various Traffic Engineering options. For one embodiment, the system side packets/cells interface supports one SPI-4.2 interface capable of operating in standard (~622 MHz) and quarter-rate (155 MHz) modes; CPU 32 bits synchronous interface; Two 32 bit and one 16 bit DDR2 for packet/cell buffering and VCAT and one ZBT SRAM operating at 200 MHz (for control).

A serial interface is shown as serial TDM system interface 160.

For one embodiment the system supports one SONET/SDH and one Mate interface capable of operating at 622 Mbits/s and 2.5 Gbits/s (TFI-5 compliant mode with integrated clock and data recovery (CDR)).

System 100 may optionally include VCAT memory 165 and/or control memory 170.

Figure 2:
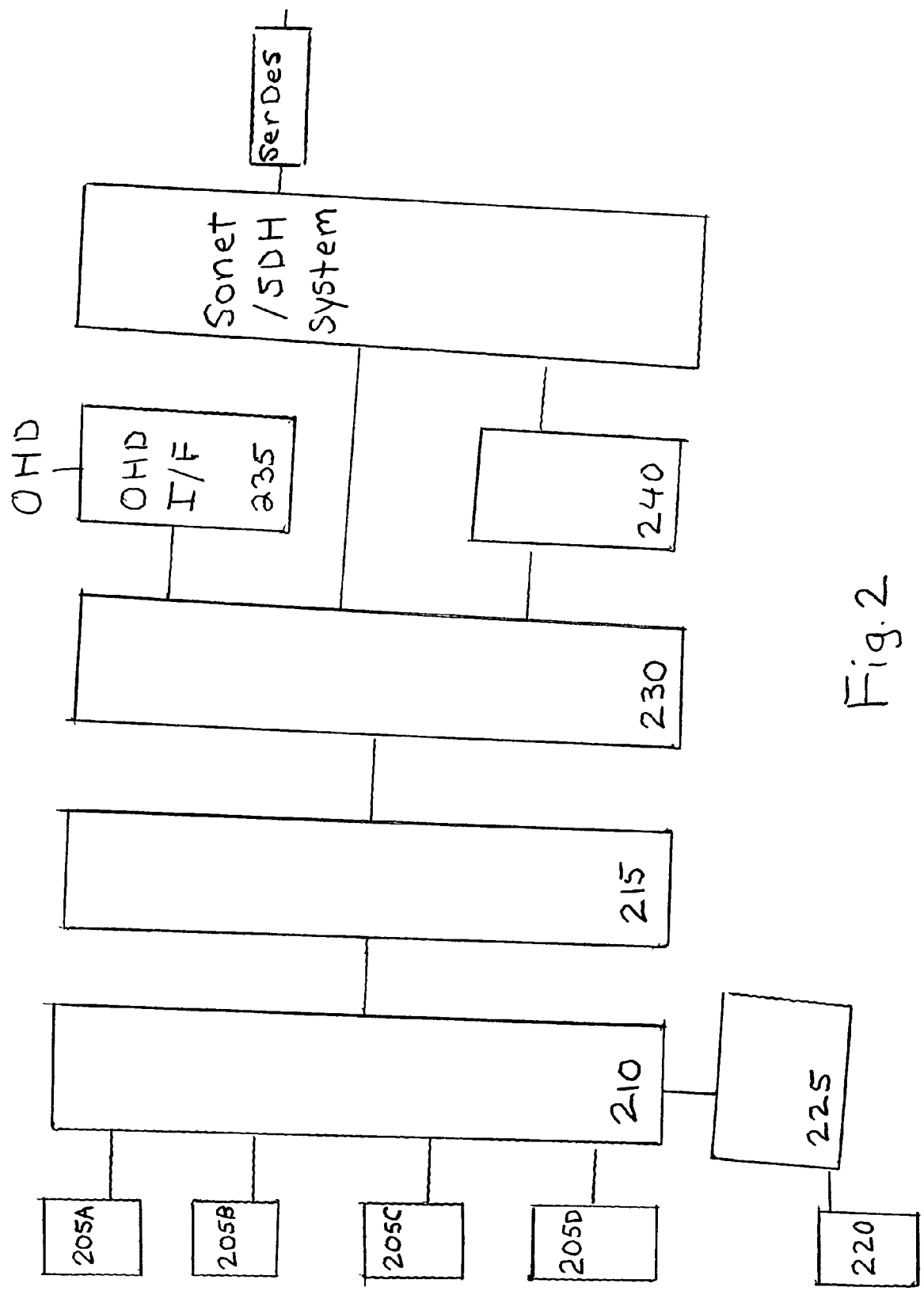
FIG. 2 illustrates TDM data flow in accordance with one embodiment of the invention.

FIG. 2 illustrates TDM data flow in accordance with one embodiment of the invention. As shown in FIG. 2, each of four high speed Serializer/Deserializers (SERDES) 205A-205D are connected with Sonet/SDH high-order and-low order processing machines 210 and 215 through a line interface shown implemented at 210. A SERDES 220 is also connected with Sonet/SDH high-order and-low order processing machines through Mate interface 225. As shown in FIG. 2, PDH Processing 230 is connected to the Sonet/SDH machines. The PDH processing can be connected directly to a PDH interface. The OHD interface 235 connects with the TDM machines for Overhead traffic processing. The VCAT/LCAS machine 240 performs Virtual Concatenation of the TDM channels traffic. For one embodiment of the invention, the system side is connected through an additional SERDES interface as shown in FIG. 2.

Figure 3:
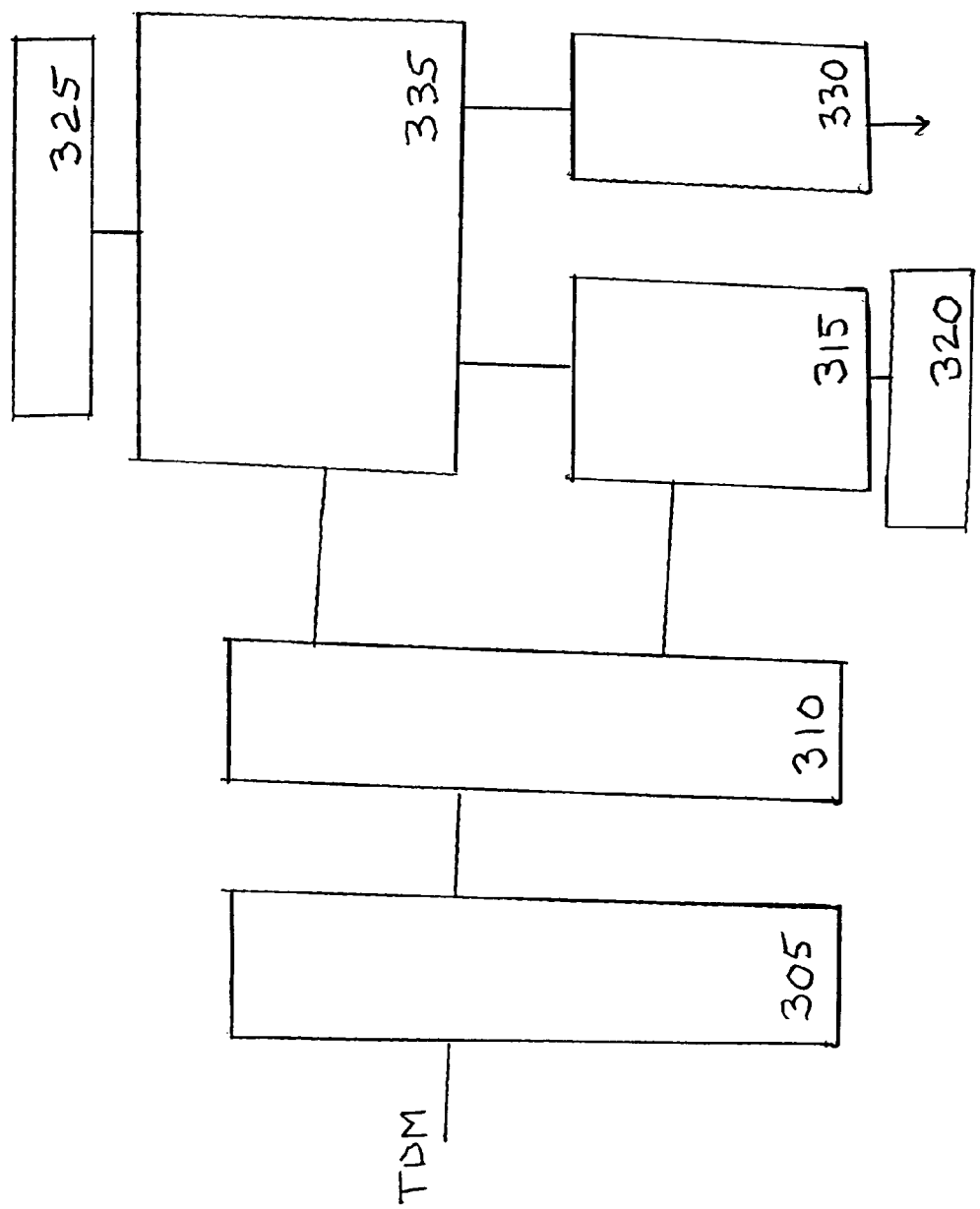
FIG. 3 illustrates packet and cell data flow in accordance with one embodiment of the invention.

FIG. 3 illustrates packet and cell data flow in accordance with one embodiment of the invention. PDH 305 is the edge stage of the TDM traffic interfaces with a packet/cell processing machine 310 which extracts or constructs packets and cells carried by the TDM channels at multiple supported packet and cell formats such as, for example ATM, FR, or HDLC. Bundling support is enabled by the packet reordering machine 315. This allows carrying a packet/cell stream over multiple links and reproducing the original order of packets and cells for Multi-Link protocols such as IMA, MLFR, MLPPP.

For one embodiment, as shown in FIG. 3, the reordering machine uses an external Sram memory 320 for storing the bundles flow processing context. For one embodiment, as shown in FIG. 3, the packets and cells are intermediately stored and queued on an external Dram memory 325. For one embodiment, as shown in FIG. 3, an SPI-4 interface 330 is implemented to support high speed packet and cell traffic in and out of the device. The implementation shown in FIG. 3 includes an integrated unit providing Packet/Cell Memory Interface and Management 335.

Figure 4:
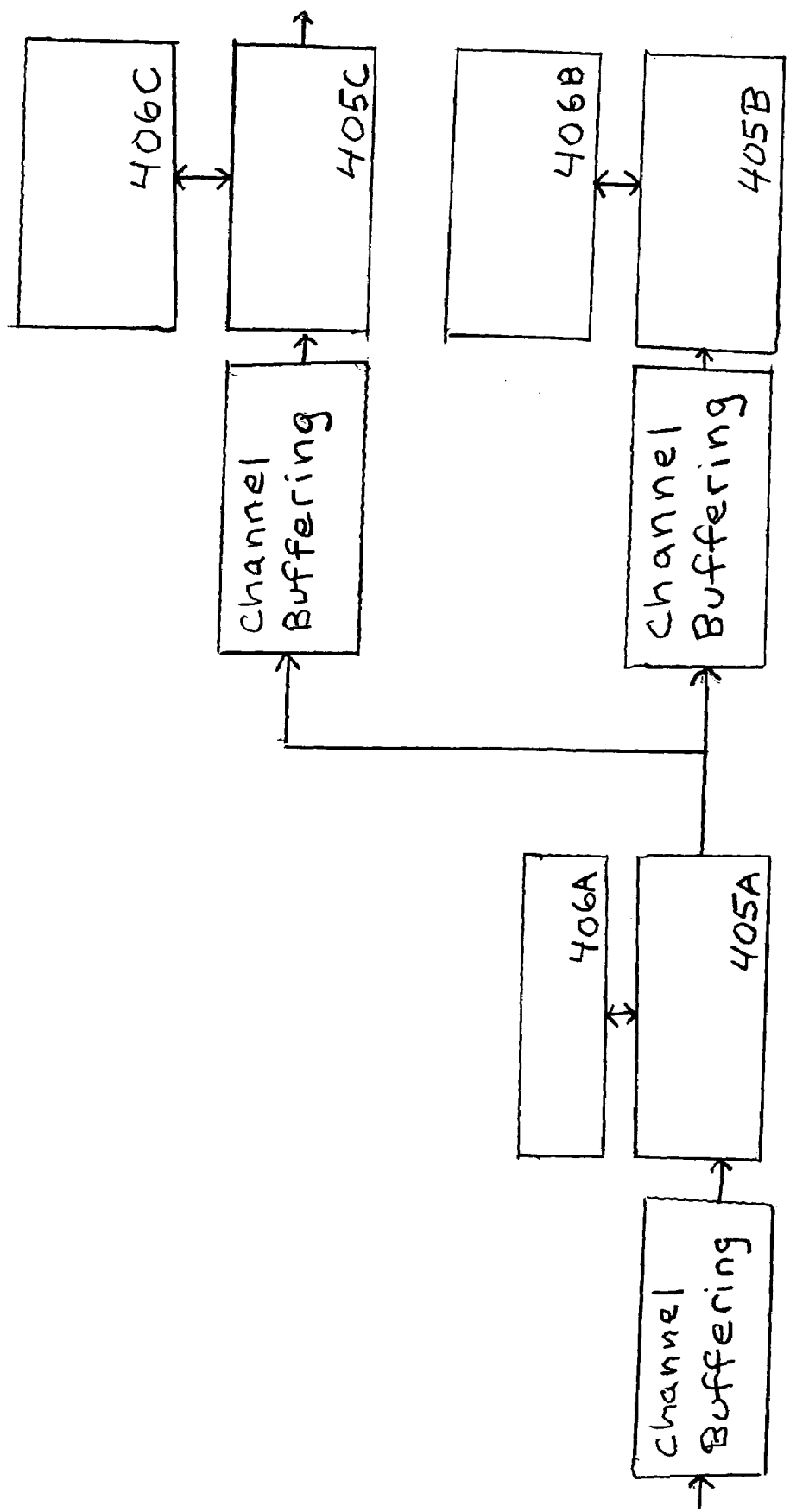
FIG. 4 illustrates deeply channelized handling accordance with one embodiment of the invention.

FIG. 4 illustrates deeply channelized handling in accordance with one embodiment of the invention. The concept of deeply channelized handling is used across the implementation of the device thus enabling the efficient processing of the many channels. As illustrated in FIG. 4, each of the separate machines composing the device, which are shown for example, as 405A-405C, has context memory storage 406A-406B, respectively. Each machine also has a single instance of the function hardware machine; the single hardware machine instance serves many channels by turns. When a channel is served its context is retrieved from the context memory storage. Once the channel has been served, the context is stored back to the context memory storage. When a channel is not being served its data is accumulates into buffers (shown for example as 410A-410C). In accordance with various embodiments of the invention, the deeply channelized handling process guarantees that the service turn around cycle is such that buffers will not overflow.

In accordance with one embodiment of the invention, data processing is effected using a digital processing system (DPS). The DPS may be configured to store, process, and communicate a plurality of various types of digital information.

Figure 5:
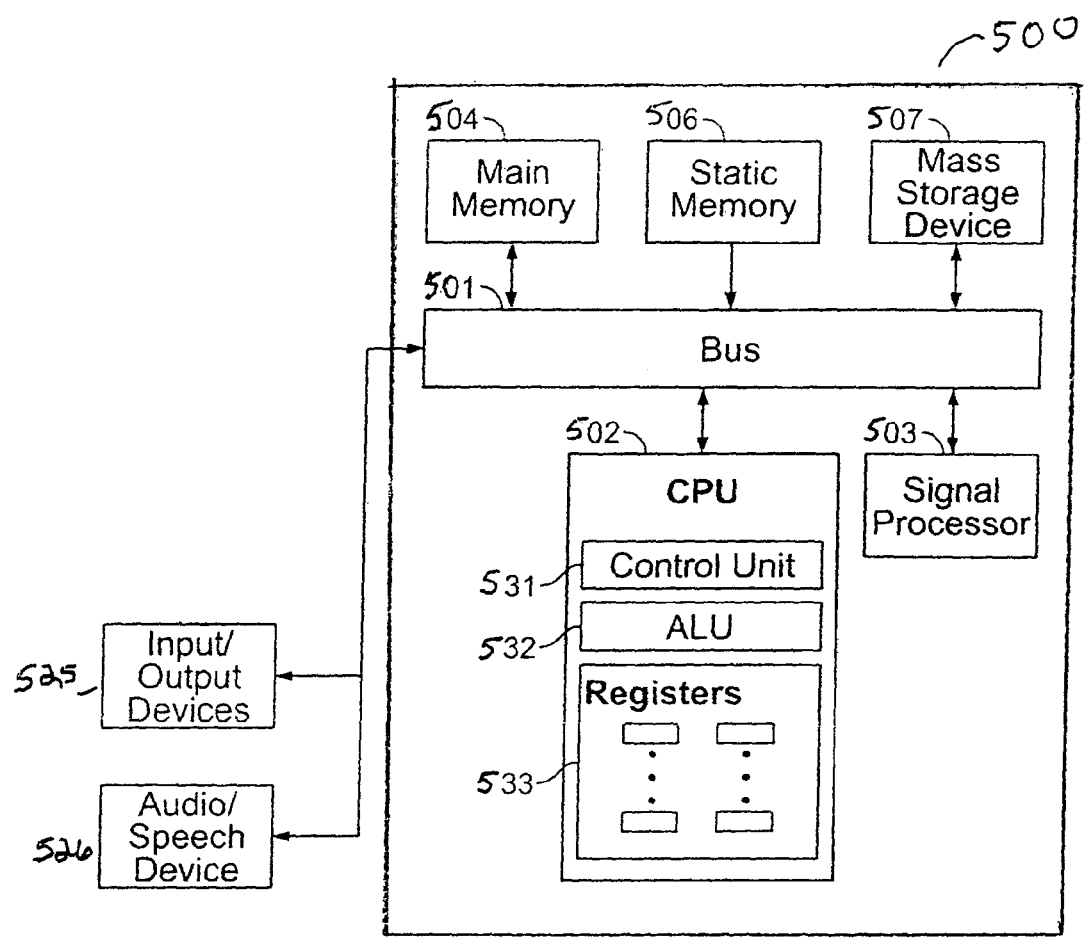
FIG. 5 illustrates a functional block diagram of a digital processing system in accordance with one embodiment of the invention.

As discussed above, embodiments of the invention may employ a DPS or devices having digital processing capabilities. FIG. 5 illustrates a functional block diagram of a digital processing system in accordance with one embodiment of the invention. The components of processing system 500, shown in FIG. 5 are exemplary in which one or more components may be omitted or added. For example, one or more memory devices may be utilized for processing system 500.

Referring to FIG. 5, processing system 500 includes a central processing unit 502 and a signal processor 503 coupled to a main memory 504, static memory 506, and mass storage device 507 via bus 501. In accordance with an embodiment of the invention, main memory 504 may store a selective communication application, while mass storage devise 507 may store various digital content as discussed above. Processing system 500 may also be coupled to input/output (I/O) devices 525, and audio/speech device 526 via bus 501. Bus 501 is a standard system bus for communicating information and signals. CPU 502 and signal processor 503 are processing units for processing system 500. CPU 502 or signal processor 503 or both may be used to process information and/or signals for processing system 500. CPU 502 includes a control unit 531, an arithmetic logic unit (ALU) 532, and several registers 533, which are used to process information and signals. Signal processor 503 may also include similar components as CPU 502.

Main memory 504 may be, e.g., a random access memory (RAM) or some other dynamic storage device, for storing information or instructions (program code), which are used by CPU 502 or signal processor 503. Main memory 504 may store temporary variables or other intermediate information during execution of instructions by CPU 502 or signal processor 503. Static memory 506, may be, e.g., a read only memory (ROM) and/or other static storage devices, for storing information or instructions, which may also be used by CPU 502 or signal processor 503. Mass storage device 507 may be, e.g., a hard or floppy disk drive or optical disk drive, for storing information or instructions for processing system 500.

General Matters

Embodiments of the invention provide Layer 1 TDM framing, multiplexing, and mapping as well as Layer 2 data and protocol processing. One embodiment of the invention, provides a fully integrated Layer1/Layer2 monolithic aggregation device. Such an embodiment provides a complete implementation for clear channel and deeply channelized TDM SONET/SDH and applications with total bandwidth of approximately 2.5 Gigabit per second carrying at least 2000 independent or concatenated service channels.

One embodiment implements functionality of Layer 2 data and protocol processing as well as Layer 1 TDM framing, multiplexing and mapping. For one embodiment, target applications include packet-based transport systems, multi-service access and metro systems, switches and routers and ADM/MSPP systems.

In accordance with various alternative embodiments, for cost and pricing optimization, the system can be implemented to provide a variety of functionality thus enabling partial functionality of its full capabilities targeting different market segments.

Embodiments of the invention have been described as including various operations. Many of the processes are described in their most basic form, but operations can be added to or deleted from any of the processes without departing from the scope of the invention.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A system comprising:
a fully integrated Layer 1/Layer 2 monolithic aggregation device, the device being a single integrated circuit on a single chip providing a System-on-Chip implementation for clear channel traffic in a first configuration and deeply Channelized TDM SONET/SDH traffic in a second configuration wherein each of the first configuration and the second configuration having total traffic transferring and processing bandwidth of up to 2.5 Giga bits per second where the system configuration can range from a first configuration carrying a single clear channel at 2.5 Gb/s, in which the entire channel traffic content comprises a single flow of communication not composed of multiple subchannels, or a second configuration carrying above 2000 independent or concatenated, clear or channelized service channels at a total bandwidth of 2.5 Gb/s, wherein each of the first configuration and the second configuration includes SONET/PDH and PDH interfaces for interfacing to a TDM network and a system packet interface (SPI) for interfacing to a data packets network; and
a multi-rate SONET/SDH interface configured to operate at 2.5 Gbit/s, 622 Mbit/s and 155 Mbit/s and three multi-rate SONET/SDH interfaces configured to operate at 622 Mbit/s and 155 Mbit/s including integrated Clock Data Recovery (CDR), implemented on a line side of the device; a SONET/SDH interface configured to operate at 622 Mbit/s and 2.5 Gbit/s TDM fabric-to-frame interface (TFI-5) compliant mode having integrated CDR implemented on a system side of the device; and a SONET/SDH interface configured to operate at 622 Mbit/s and 2.5 Gbit/s TFI-5 compliant mode having integrated CDR implemented on a Mate side of the device.

2. The system of claim 1 configured to operate to support TDM multiplexing and mapping of the OC-48 (STM-16) or 4×OC12/OC-3 (STM-4/STM-1) payload, including STS-48c (VC-4-16c), STS-12c (VC-4-4c), STS-3c (VC-4), STS-1, DS3/E3, DS1/E1/J1, directly mapped to SONET/SDH or via M13, and DS0.

3. The system of claim 2 wherein inverse multiplexing over ATM (IMA) and multi-link point-to-point protocol (MLPPP) bundling protocols are supported.

4. The system of claim 1 including an STS-1 cross connect between a line interface and a Mate interface to allow line and line card protection, the STS-1 cross connect connecting the device to a system backplane TDM interface for port-less applications or mixed applications wherein a portion of data is from the line and a portion is from the system.

5. The system of claim 1 having an external overhead processing support such that all SONET/SDH and PDH overhead bytes are accessible for insertion and extraction through external interfaces, the device automatically processing overhead bytes.

6. The system of claim 1 wherein each channel supports native mapping to a TDM system interface for circuit emulation or direct connection to a TDM backplane.

7. The system of claim 1 wherein each channel can be configured to transfer TDM data between a telecom equipment system side and a client line side or to packets and cells data channels extracted out of the TDM incoming data channel and constructed into the outgoing TDM data channel.

8. The system of claim 1 including a channel termination and a packet data processing support protocols with virtual concatenation (VCAT) and link capacity adjustment scheme (LCAS) support, the protocols selected from the group consisting of ATM, HDLC, generic framing procedure (GFP), Ethernet over GFP, and combinations thereof.

9. The system of claim 1 further comprising: a packets and cells interface including store and forward as well as streaming modes, selectable flow controls and status reporting, the packets and cells interface having scheduling mechanisms that allow for transparent quality of service and traffic engineering options.

10. The system of claim 9 supporting circuit emulation for each possible DS1, E1 or J1 channel (or partial channel) with structured agnostic TDM over packet (SAToP) or circuit emulation service over packet switching network (CESoPSN) transport mode selectable per channel.

11. The system of claim 1 further comprising: a 32 bits synchronous external CPU interface for configuration, management, and monitoring purposes.

12. The system described in claim 11 further comprising: three 32 bit DDR2 interfaces operating at 311 MHz for packet/cell and VCAT buffering.

13. The system of claim 1 further comprising: a SRAM interface operating at 155 MHz for storing bundling control data.

14. The system of claim 1 implemented by integrated dedicated hardware machines each handling specific supported applications wherein each hardware machine can serve multiple independent data channel entities utilizing an on chip memory for storing and retrieving specific entities when being served and external memory for temporary storage of packets, cells and bundling management information.

15. The system of claim 1 having embedded monitoring and internal looping mechanisms providing debug and testability assistance.

16. The system of claim 1 supporting TDM framing, TDM mapping, and TDM multiplexing selected from a OC-48/4× OC-12/4×OC-3 (STM-16/4×STM-4/4×STM-1) device, a OC-12/4×OC-3 (STM-4/4×STM-1) device, a OC-3 (STM-1) device, a 24×DS3/E3 device, a 12×DS3/E3 (STM-4/4×STM-1) device, and combinations thereof.

17. The system of claim 1 supporting channelized legacy protocol processing including ATM, inverse multiplexing over ATM (IMA), HDLC and derivatives thereof and multi-link point-to-point protocol (MLPPP).

18. The system of claim 17 supporting Ethernet over generic framing procedure (GFP) over hi/lo-order SONET/SDH virtual concatenation (VCAT) and PDH VCAT with link capacity adjustment scheme (LCAS).

* * * * *